(12) United States Patent
Umamaheswaran et al.

(10) Patent No.: US 10,708,766 B1
(45) Date of Patent: Jul. 7, 2020

(54) SYSTEMS AND METHODS FOR ACTIVATING DEVICES

(71) Applicant: Verizon Patent and Licensing Inc., Arlington, VA (US)

(72) Inventors: Kartik P. Umamaheswaran, Belle Mead, NJ (US); Zhengfang Chen, Millburn, NJ (US); Rashmi Naik, Bridgewater, NJ (US); Vijayanand K. Paulrajan, Bridgewater, NJ (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 0 days.

(21) Appl. No.: 16/414,010

(22) Filed: May 16, 2019

(51) Int. Cl.
  *H04W 76/10* (2018.01)
  *H04W 76/12* (2018.01)
  *H04W 8/24* (2009.01)
  *H04W 8/18* (2009.01)
  *H04W 4/60* (2018.01)
  *H04W 60/00* (2009.01)
  *H04W 8/26* (2009.01)

(52) U.S. Cl.
  CPC ............. *H04W 8/245* (2013.01); *H04W 4/60* (2018.02); *H04W 8/18* (2013.01); *H04W 8/26* (2013.01); *H04W 60/00* (2013.01)

(58) Field of Classification Search
  CPC ....... H04W 76/10; H04W 4/50; H04W 8/183; H04W 76/12; H04W 52/0296
  USPC ................................................... 455/419, 558
  See application file for complete search history.

(56) References Cited

U.S. PATENT DOCUMENTS

| | | | | |
|---|---|---|---|---|
| 9,838,866 | B2 * | 12/2017 | Mistry | G06F 9/445 |
| 10,263,655 | B2 * | 4/2019 | Cha | H04W 76/10 |
| 10,349,266 | B1 * | 7/2019 | Kant | H04W 8/183 |
| 10,412,682 | B2 * | 9/2019 | Singh | H04W 76/10 |
| 2015/0181419 | A1 * | 6/2015 | Mistry | G06F 9/445 |
| | | | | 455/419 |
| 2016/0020803 | A1 * | 1/2016 | Cha | H04W 76/10 |
| | | | | 455/558 |
| 2016/0255050 | A1 * | 9/2016 | Grayson | H04W 76/12 |
| | | | | 726/1 |
| 2019/0069248 | A1 * | 2/2019 | Singh | H04W 52/0296 |

* cited by examiner

*Primary Examiner* — William D Cumming

(57) ABSTRACT

A method may include receiving identification information associated with a user device and determining whether the user device is associated with a new order or an upgrade order associated with a wireless service provider. The method may also include activating an order in response to determining that the user device is associated with an upgrade order and identifying address information of a network device associated with obtaining a subscriber identity module (SIM) profile for the user device. The method may further include forwarding the address information to the user device, receiving, by the network device, a request from the user device for the SIM profile and transmitting, by the network device, the SIM profile to the user device.

20 Claims, 8 Drawing Sheets

SYSTEMS AND METHODS FOR ACTIVATING DEVICES

BACKGROUND INFORMATION

Activating a smart phone for use over wireless networks typically involves receiving the smart phone that includes a physical subscriber identity module (SIM) card. The SIM card is typically pre-provisioned with information that allows a user of the smart phone to contact a wireless service provider to activate the smart phone. For example, the SIM card includes a profile that can be authenticated with back-end servers of the wireless service provider to activate the smart phone.

With the increased use of embedded SIMs (eSIMs) on newer smart phones, also referred to as embedded universal integrated circuit cards (eUICCs), activating a smart phone has become more cumbersome. For example, when a customer receives a new smart phone and wishes to establish a new wireless service with a wireless service provider, no wireless service provider profile is prestored on the eSIM.

For some service providers, to activate a new service for a mobile device with an eSIM, the wireless service provider may require the user to download an application associated with the wireless service provider, followed by using a quick response (QR) code provided at the point-of-sale location where the mobile device was purchased or a QR code provided on a paper included in the packaging with the new mobile device. The user/customer may use the camera function of the mobile device to scan the QR code, followed by a number of additional steps to obtain information based on the QR code and then download a profile to be stored in the eSIM/eUICC. Such steps associated with activating a new service for a new mobile device are often time-consuming and difficult for customers to follow. In addition, the steps described above for activating a new service for a new mobile device are not available for a scenario in which the user is already a customer/subscriber of a wireless service provider and is upgrading his/her mobile device while maintaining the same telephone number for the new device.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein provide for activating a device with an eSIM. In an exemplary implementation, a user receiving a new user device that includes an eSIM may power up the new device. The use device may then automatically interface with elements of a wireless carrier/service provider network (also referred to herein as service provider) to activate the device, regardless of whether the activation involves a new service or is associated with a new/upgrade device for an existing service plan. In either case, the user device interacts with elements of the service provider to obtain a SIM profile for the eSIM. For example, the user device provides an identifier associated with the user device to the service provider. If a new or upgrade order is pending, the service provider generates an address, such as a fully qualified domain name (FQDN), of a SIM profile platform and provides the address to the user device. The user device may then download and store the SIM profile in the eSIM to activate the user device. In this manner, activation of a device may be performed without the need for human interaction, such as the user calling a service center, interacting with a customer service representative, making follow-up calls, etc. As a result, the customer experience with respect to device activation is improved and delays associated with device activation are reduced or eliminated.

Figure 1:
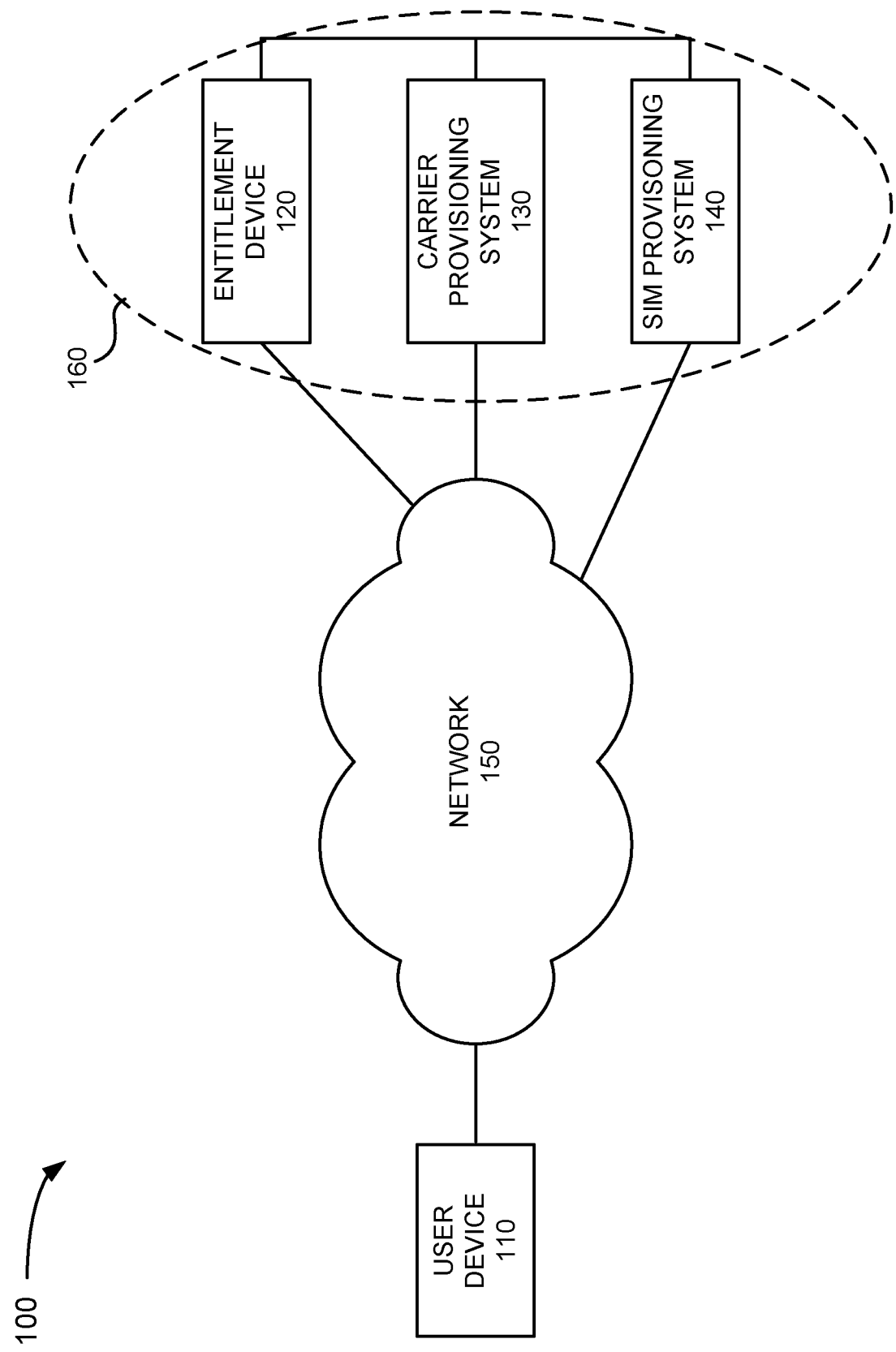
FIG. 1 illustrates an exemplary environment in which systems and methods described herein may be implemented.

FIG. 1 is a block diagram of an exemplary environment 100 in which systems and methods described herein may be implemented. Environment 100 may include user device 110, entitlement device 120, carrier provisioning system 130, SIM provisioning system 140 and network 150. The elements shown within dotted area 160 (i.e., entitlement device 120, carrier provisioning system 130 and SIM provisioning system 140) may all be associated with a wireless service provider that provides wireless services to user device 110. The elements shown within dotted area 160 may also be interconnected via an internal company network, such as a local area network or wide area network, that includes wired, wireless and/or optical connections between the elements illustrated in FIG. 1. In other implementations, the devices illustrated within dotted area 160 may be directly coupled or indirectly coupled to each other via an external network, such as the Internet.

User device 110 may include a mobile device, such as wireless or cellular telephone device (e.g., a conventional cell phone with data processing capabilities), a smart phone, a personal digital assistant (PDA) that can include a radio-telephone, etc. In another implementation, user device 110 may include any type of mobile or fixed computer device or system, such as a personal computer (PC), a laptop, a tablet computer, a notebook, a netbook, a wearable computer (e.g., a wrist watch, eyeglasses, etc.), a game playing device, a music playing device, a home appliance device, a home monitoring device, an Internet of things (IoT) device, etc., that may include communication functionality. User device 110 may connect to network 150 and other devices in environment 100 (e.g., entitlement device 120, carrier provisioning system 130 and SIM provisioning system 140, etc.) via any conventional technique, such as wired, wireless, optical connections or a combination of these techniques. User device 110 and the person associated with user device 110 (e.g., the party holding or using user device 110) may be referred to collectively as user device 110 in the description below. In an exemplary implementation, user device 110 may include a mobile or fixed device that includes an embedded subscriber identity module (eSIM), as described in more detail below.

Entitlement device 120 may include one or more computer devices and systems associated with providing services via network 150. For example, in one implementation, entitlement device 120 may correspond to a front end or an interface to a wireless carrier's point-of-sale (POS) and/or billing system. For example, entitlement device 120 may be associated with a wireless service provider that provides wireless services, such as cellular telephone and data services to user device 110 via network 150. Entitlement device 120 may store and/or access other devices that store information regarding service plans and orders for a large number of user devices (also referred to herein as customers or subscribers). Entitlement device 120 may also communicate with user device 110, carrier provisioning system 130 and/or SIM provisioning system 140 to facilitate activation of user device 110 for a new service, an upgrade to an existing service, etc., as described in detail below.

Carrier provisioning system 130 may include one or more computing devices or systems that act as a backend for a wireless carrier to facilitate operations of network 150. For example, carrier provisioning system 130 may include billing-related systems/databases, an electronic telephone number inventory (ETNI), a mobile terminating access service (MTAS), a home subscriber server (HSS), a unified data management (UDM) function, etc. Carrier provisioning system 130 may interact with entitlement device 120 and SIM provisioning system 140 to facilitate activation of user device 110, as described in detail below.

SIM provisioning system 140 may include one or more computing devices or systems that provide for remote provisioning of SIM profiles to user devices 110. For example, SIM provisioning system 140 may include a subscription manager—data preparation (SM-DP) device that stores SIM profiles that may be downloaded to user devices 110 to enable a customer to activate a new line/service, upgrade an existing service with a new device, etc.

Network 150 may include one or more wired, wireless and/or optical networks that are capable of receiving and transmitting data, voice and/or video signals. For example, network 140 may include one or more public switched telephone networks (PSTNs) or other type of switched network. Network 150 may also include one or more wireless networks and may include a number of transmission towers for receiving wireless signals and forwarding the wireless signals toward the intended destination. Network 150 may further include one or more satellite networks, one or more packet switched networks, such as an Internet protocol (IP) based network, a local area network (LAN), a wide area network (WAN), a personal area network (PAN), a WiFi network, a Bluetooth network, an intranet, the Internet, or another type of network that is capable of transmitting data. Network 150 provides wireless packet-switched services and wireless Internet protocol (IP) connectivity to user devices 110 to provide, for example, data, voice, and/or multimedia services.

The exemplary configuration illustrated in FIG. 1 is provided for simplicity. It should be understood that a typical environment may include more or fewer devices than illustrated in FIG. 1. For example, environment 100 may include a large number (e.g., thousands or more) of user devices 110, multiple entitlement devices 120, carrier provisioning systems 130 and SIM provisioning systems 140. In addition, environment 100 (e.g., network 150) may include additional elements, such as evolved NodeBs (eNodeBs), next generation NodeBs (gNodeBs), base stations, switches, gateways, routers, monitoring devices, etc., that aid in routing data and providing information of interest.

Various functions are described below as being performed by particular components in environment 100. In other implementations, various functions described as being performed by one device may be performed by another device or multiple other devices, and/or various functions described as being performed by multiple devices may be combined and performed by a single device.

Figure 2:
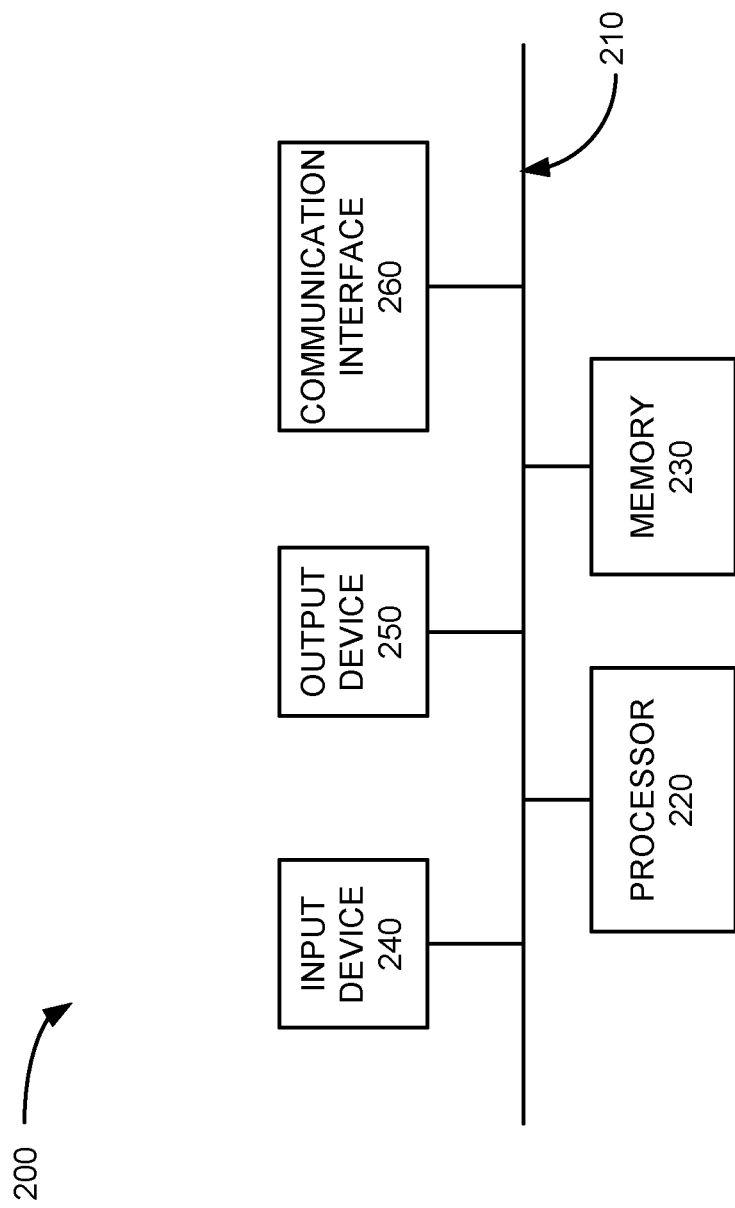
FIG. 2 illustrates an exemplary configuration of components implemented in one or more of the devices/elements of FIG. 1.

FIG. 2 illustrates an exemplary configuration of a device 200. Device 200 may correspond to or include elements implemented in user device 110, entitlement device 120, carrier provisioning system 130 and SIM provisioning system 140. Referring to FIG. 2, device 200 may include bus 210, processor 220, memory 230, input device 240, output device 250 and communication interface 260. Bus 210 may include a path that permits communication among the elements of user device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive.

Input device 240 may include a mechanism that permits a user to input information, such as a keyboard, a keypad, a mouse, a pen, a microphone, a touch screen, voice recognition and/or biometric mechanisms, etc. Output device 250 may include a mechanism that outputs information to the user, including a display (e.g., a liquid crystal display (LCD)), a printer, a speaker, etc. In some implementations, a touch screen display may act as both an input device and an output device.

Communication interface 260 may include one or more transceivers that device 200 uses to communicate with other devices via wired, wireless or optical mechanisms. For example, communication interface 260 may include one or more radio frequency (RF) transmitters, receivers and/or transceivers and one or more antennas for transmitting and receiving RF data via network 150. Communication interface 260 may also include a modem or an Ethernet interface to a LAN or other mechanisms for communicating with elements in a network, such as network 150 or another network.

The exemplary configuration illustrated in FIG. 2 is provided for simplicity. It should be understood that device 200 may include more or fewer devices than illustrated in FIG. 2. In an exemplary implementation, device 200 performs operations in response to processor 220 executing sequences of instructions contained in a computer-readable medium, such as memory 230. A computer-readable medium may be defined as a physical or logical memory device. The software instructions may be read into memory 330 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
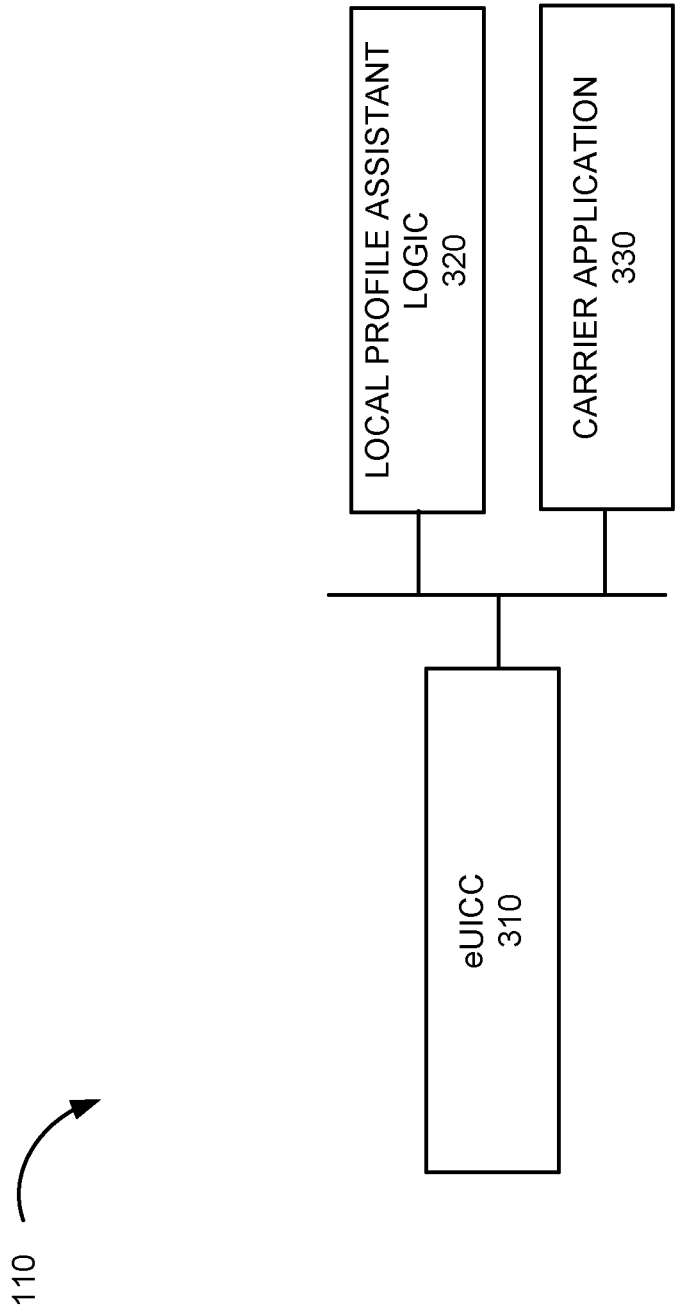
FIG. 3 illustrates an exemplary configuration of logic components included in the user device of FIG. 1.

FIG. 3 is an exemplary block diagram of components implemented in user device 110. In an exemplary implementation, all or some of the components illustrated in FIG. 3 may be implemented by processor 220 executing software instructions stored in memory 230.

Referring to FIG. 3, user device 110 includes eUICC 310, local profile assistant logic 320 and carrier application 330. eUICC 310 may be an embedded memory device that is used to store an eSIM profile. The eSIM profile may store a user's subscription information and network setting-related information and allows user device 110 to connect to a wireless network (e.g., network 150). In one implementation, eUICC 310 may be part of memory 230 (FIG. 2). In accordance with implementations described herein, eUICC 310 may not come pre-loaded with a SIM profile associated with a wireless service provider, such as the wireless service provider associated with entitlement device 120. User device 110 may interact with one or more of the elements illustrated in FIG. 1 to obtain a SIM profile that will be stored in eUICC 310, as described in detail below.

Local profile assistant (LPA) logic 320 may include logic associated with interfacing with eUICC 310 and carrier application 330 to activate user device 110. In an exemplary implementation, LPA logic 320 may be part of the operating system of user device 110 which is stored in memory 230 and executed by processor 220. LPA logic 320 may interact with carrier application 330 to obtain an eSIM profile that will be stored in eUICC 310.

Carrier application 330 may include an application stored in memory 230 and executed by processor 220 to perform various actions associated with user device 110. For example, in one implementation, carrier application 330 may be associated with a particular service provider, such as a service provider associated with entitlement device 120, carrier provisioning system 130 and SIM provisioning system 140. Carrier application 330 may be loaded on user device 110 at the time of manufacturing or purchasing of user device 110. For example, if user device 110 is ordered from the service provider associated with entitlement device 120, carrier application 330 may be loaded on user device 110 by the service provider or the device manufacturer. In other implementations, carrier application 330 may be downloaded to user device 110 at the time of activating user device 110. In either case, carrier application 330 may interface with a wireless service provider to obtain a SIM profile for user device 110, as described in detail below.

Although FIG. 3 shows exemplary components of user device 110, in other implementations, user device 110 may include fewer components, different components, differently arranged components, or additional components than depicted in FIG. 3. In addition, functions described as being performed by one of the components in FIG. 3 may alternatively be performed by another one or more of the components of user device 110.

Figure 4A:
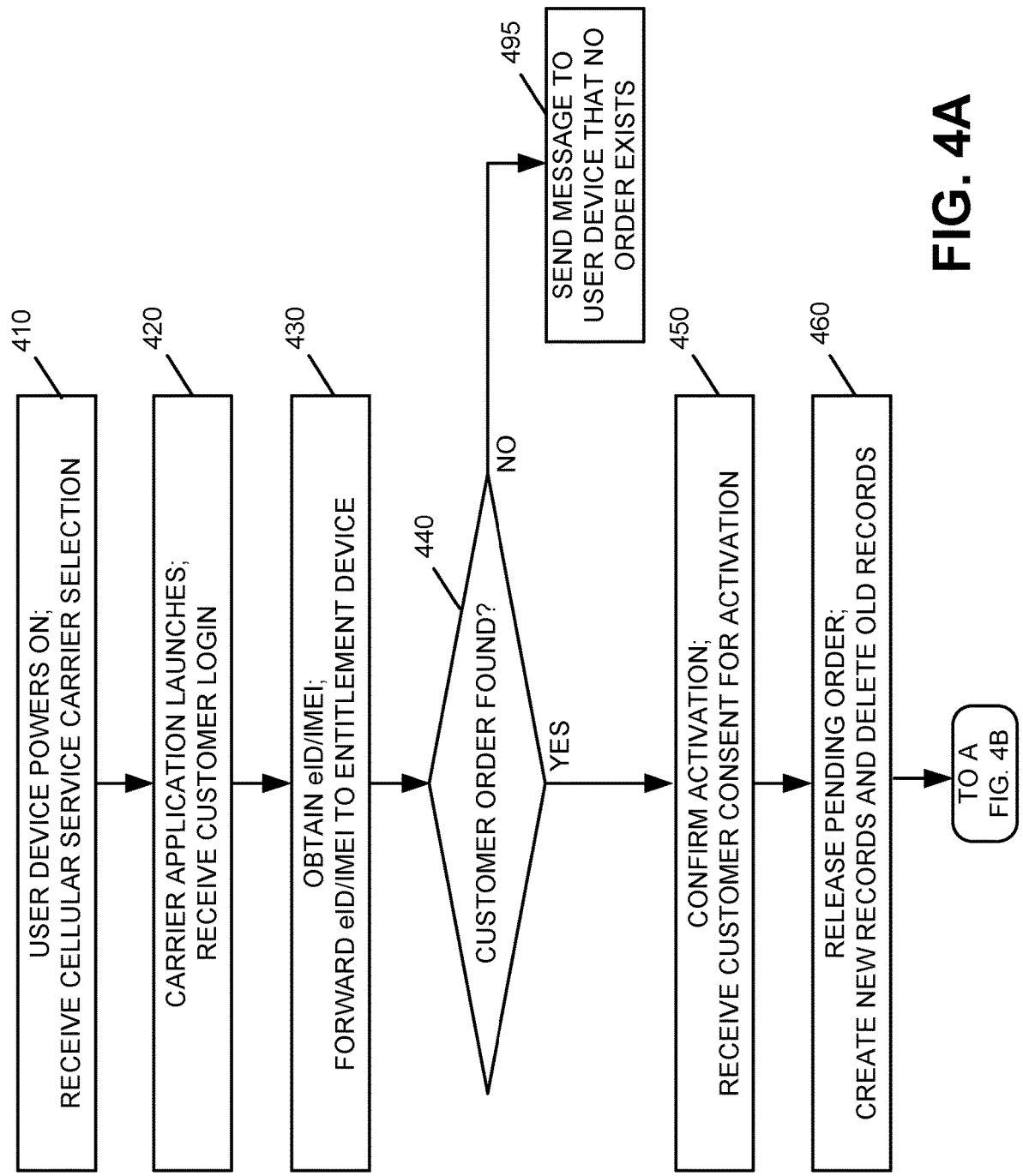
FIGS. 4A and 4B are flow diagrams illustrating processing by various components in FIGS. 1-3 associated with an upgrade order in accordance with an exemplary implementation.
Figure 4B:
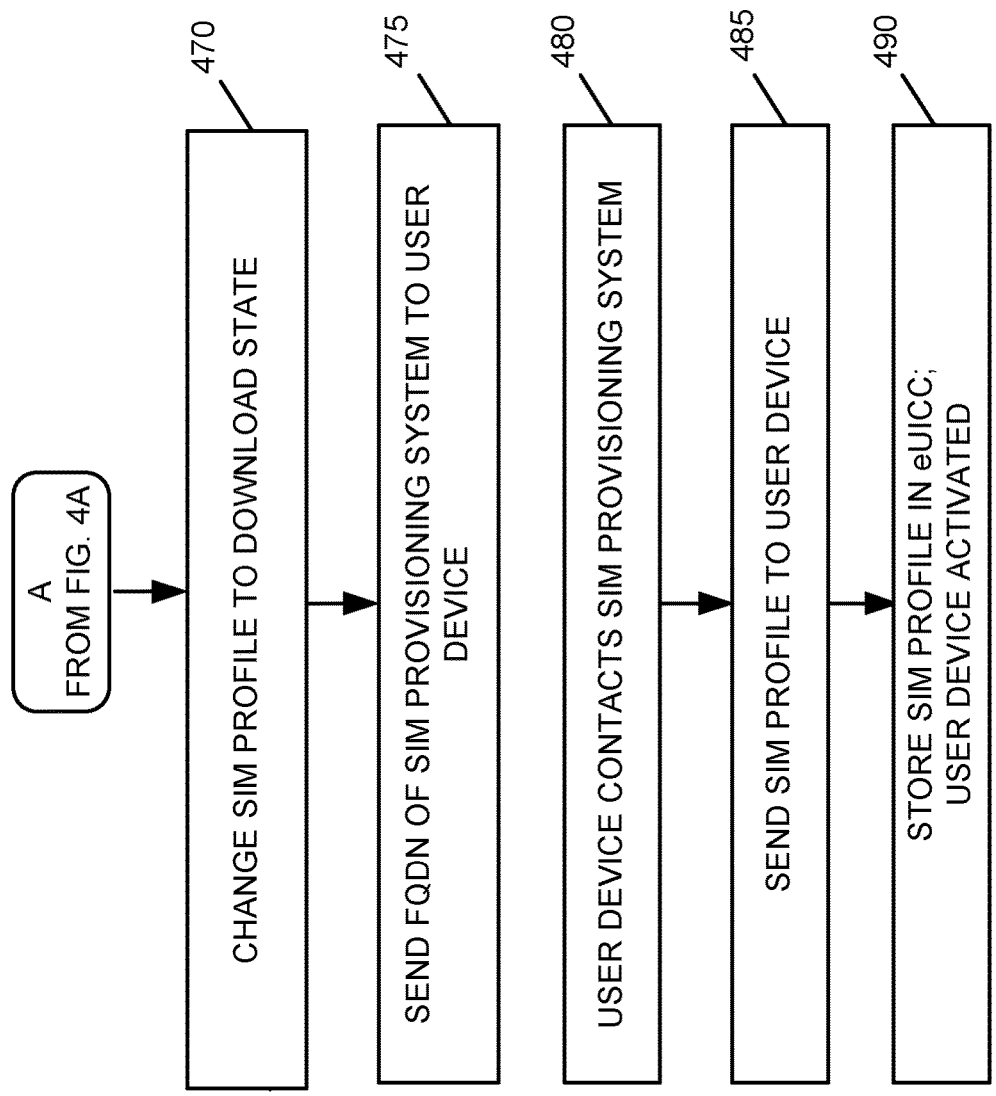

FIGS. 4A and 4B are flow diagrams illustrating processing associated with activating user device 110 associated with an upgrade order. The term "upgrade order" as used herein refers to a current customer/subscriber of a wireless service provider subscribing to an upgrade service, such as purchasing a new smart phone while maintaining the customer/subscriber's existing mobile directory number (MDN) for the new mobile device. The flow diagram of FIGS. 4A and 4B are described in conjunction with the signal flow diagram of FIG. 5. Processing may begin with a customer receiving a new user device 110 and powering up the new user device 110 (FIG. 4A, block 410). Upon powering up, user device 110 may launch and display a user interface requesting that the user select from a number of different wireless/cellular service providers. In other implementations, user device 110 may be configured to interface with one particular service provider and may not provide a number of different options for the user. In either case, assume that the user selects the service provider associated with his/her existing wireless service, such as the service provider associated with entitlement device 120 (block 410, FIG. 5, 502).

Figure 5:
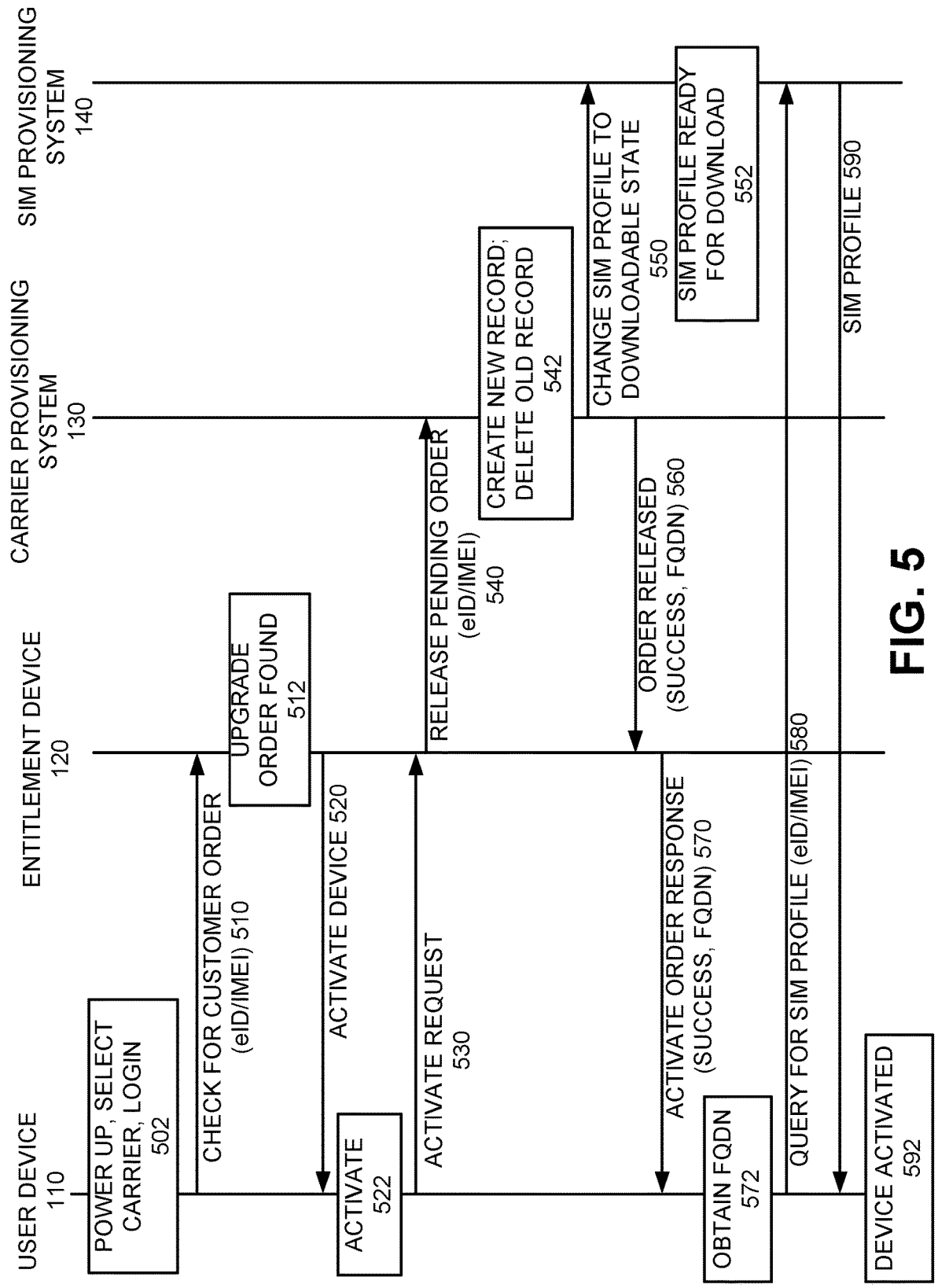
FIG. 5 is a signal flow diagram associated with the processing of FIGS. 4A and 4B; a FIG. 6 is a flow diagram illustrating processing by various components in FIGS. 1-3 associated with a new service order for a user in accordance with an exemplary implementation.

As described above, carrier application 330 may be associated with a particular service provider and may be loaded on user device 110 at the time of purchase of user device 110. Alternatively, in response to the selection corresponding to entitlement device 120, user device 110 may download carrier application 330 from the selected service provider, such as from entitlement device 120, via a WiFi connection or other public/shared Internet connection. In either case, after the user selects the particular wireless service provider, carrier application 330 launches (block 420). Carrier application 330 may output a user interface via a display screen of user device 110 and request that the user login. The user may then provide customer login information associated with his/her account with the wireless service provider (block 420; FIG. 5, 502). Upon receiving the customer login information, carrier application 330 may communicate with LPA logic 320 to obtain the eUICC identifier/identification (eID) or international mobile equipment identity (IMEI) number (also referred to herein as IMEI) associated with user device 110 and stored in LPA logic 320 (block 430). The eID and/or IMEI stored in LPA logic 320 are each unique to user device 110.

Carrier application 330 may then send a query to entitlement device 120 to check for a customer order, such as an upgrade order or an order for a new service/line (block 430; FIG. 5, 510). Carrier application 330 may send the query via a WiFi or other public/shared Internet connection. Entitlement device 120 receives the query and determines if the eID and/or IMEI is associated with a customer order (block 440). For example, entitlement device 120 may query one or more backend systems, such as a billing system/order system associated with service provider 120 to determine if the customer has a pending upgrade order (e.g., purchased a new device). If an upgrade order corresponding to the eID/IMEI is found (block 440—yes; FIG. 5, 512), entitlement device 120 may send a message to user device 110 inquiring whether the user would like to activate user device 110 (FIG. 5, 520).

Use device 110 receives the message and outputs a message inquiring whether the user wishes to activate user device 110 (block 450). For example, carrier application 330 receives the message from entitlement device 120 and outputs a message via output device 250 (e.g., an LCD screen) asking the user to confirm that he/she wishes to activate user device 110. Assume that the user elects to activate user device 110 (block 450; FIG. 5, 522). Carrier application 330 receives the user input and sends an activation request to entitlement device 120 (FIG. 5, 530).

Entitlement device 120 receives the activation request and generates a message instructing carrier provisioning system 130 to release or activate the pending upgrade order for user device 110 (block 460). Entitlement device 120 may then transmit the activate pending order message to carrier provisioning system 130 (FIG. 5, 540). In an exemplary implementation, the activate pending order message includes the eID and/or IMEI of user device 110. Carrier provisioning system 130 receives the activate pending order message. Carrier provisioning system 130 may then create a new record for user device 110 including a SIM profile, and delete old records associated with the user's prior mobile device, including the prior SIM profile (block 460, FIG. 5, 542). For example, carrier provisioning system 130 may create a new record(s) in a "production" or active home subscriber server (HSS) or unified data management (UDM) function and delete existing records in the active HSS or UDM associated with the customer's previous mobile device. At this point, the user's previous mobile device, which had wireless service with the service provider associated with entitlement device 120, may be effectively deactivated. In an exemplary implementation, creating the active record in the production/active HSS or UDM may include moving the record for the new mobile device from a "pending" HSS or UDM to the active HSS or UDM.

Carrier provisioning system 130 may also signal SIM provisioning system 140 to change the state of the reserved or stored SIM profile associated with the eID/IMEI to a downloadable state (FIG. 4B, block 470; FIG. 5, 550). For example, when an order for a user device 110 is placed, an eSIM profile may be reserved for a particular eSIM identified by an eID/IMEI. SIM provisioning system 140 receives the message and sets the SIM profile for user device 110 into a ready for download state (FIG. 5, 552). Carrier provisioning system 130 may also send an upgrade order released message to entitlement device 120 (FIG. 5, 560). The upgrade order released message may include information indicating that the upgrade order has been successfully transitioned or released from a pending state to an active state (e.g., success), along with the fully qualified domain name (FQDN) of SIM provisioning system 140. Entitlement device 120 receives the upgrade order released message and forwards an activate upgrade order message to user device 110 (block 475; FIG. 5, 570). The activate upgrade order message 570 may include a successful order release indication and an address associated with SIM provisioning system 140, such as the FQDN of SIM provisioning system 140.

User device 110 receives the activate order response 570, including, for example, the FQDN of SIM provisioning system 140. LPA logic 320 of user device 110 obtains the FQDN of SIM provisioning system 140 from activate order response message 570. For example, carrier application 330 may receive the FQDN of SIM provisioning system 140 and forward the FQDN to LPA logic 320. LPA logic 320 may then automatically send a SIM profile request to SIM provisioning system 140, using the obtained FQDN, for the SIM profile (block 480; FIG. 5, 580). LPA logic 330 may include the eID/IMEI of user device 110 with the SIM profile request message 580. SIM provisioning system 140 receives the request and downloads the SIM profile, based on the eID/IMEI, to user device 110 (block 485; FIG. 5, 590). User device 110 receives the SIM profile and stores the SIM profile in eUICC 310 (block 490). For example, LPA logic 320 may store the SIM profile in eUICC 310. In an exemplary implementation, upon storing the SIM profile in eUICC 310, user device 110 is activated with the wireless service provider (block 490; FIG. 5, 592). In other implementations, LPA logic 320 and/or carrier application 330 may generate a refresh command to update the eSIM profile in eUICC 310, resulting in activation of user device 110. In either case, a user may activate an upgrade order for the new mobile device (i.e., user device 110) in an efficient manner. That is, user device 110 may be activated without the user having to call customer service and interact with a customer services representative, without the user device having to scan a QR code, etc.

Referring back to FIG. 4A, if entitlement device 120 does not identify an existing order for user device 110 (block 440—no), entitlement device 120 may send a message to user device 110 indicating that no order exists (FIG. 4A, block 495). Further processing associated with the scenario in which no order is found is described below with respect to FIG. 7.

Figure 6:
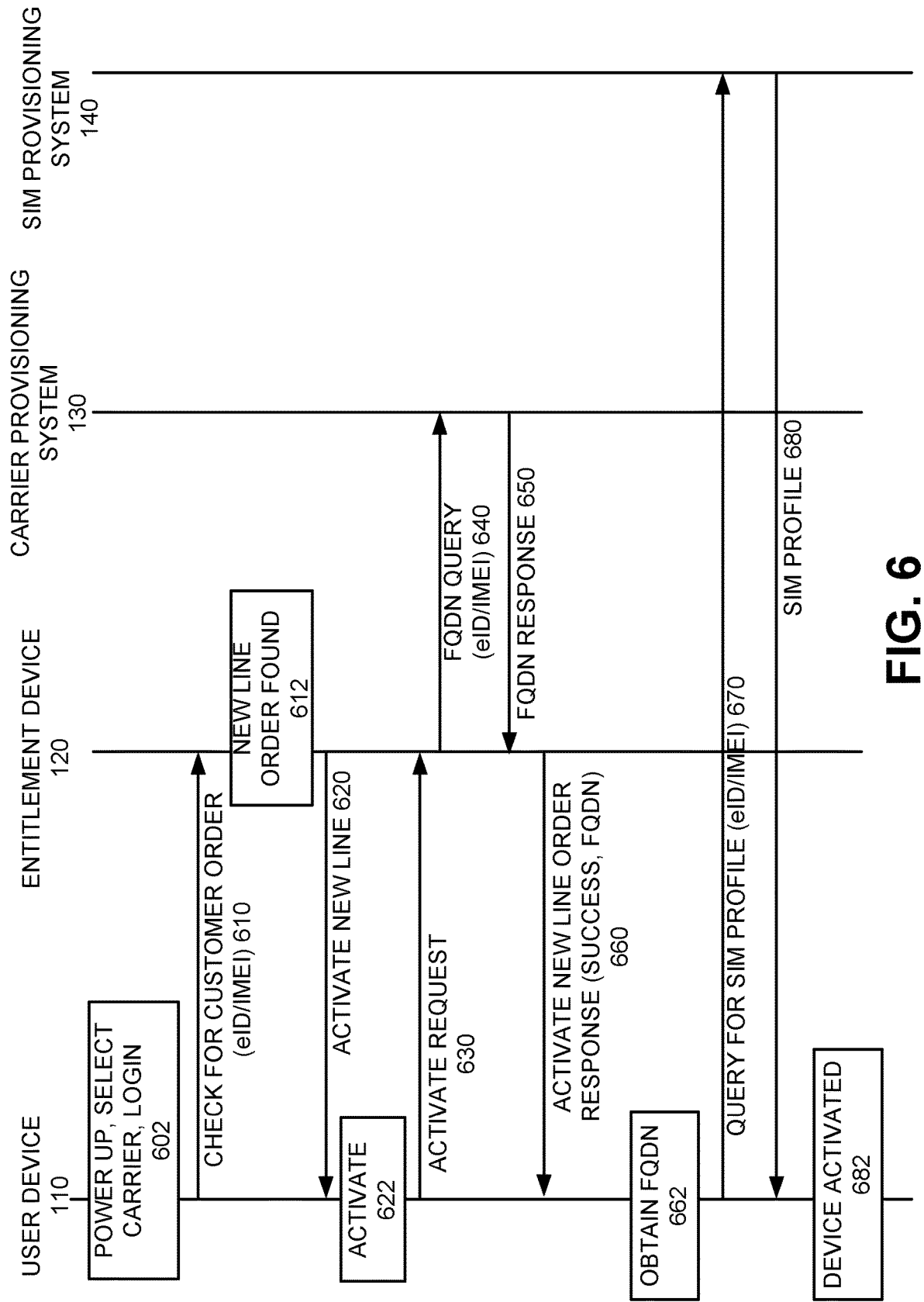

As described above, a customer may activate an upgrade order associated with a new mobile device. In other instances, a customer may decide to activate a new line/service. FIG. 6 is a signal flow diagram associated with a customer adding new line. Processing may begin in a manner similar to that described above with respect to FIGS. 4A, 4B and 5. For example, a customer at user device 110 may power up user device 110, select a particular carrier and login (FIG. 6, 602).

Upon receiving the customer login information, carrier application 330 may communicate with LPA logic 320 to obtain the eID/IMEI of user device 110 stored in LPA logic 320. Carrier application 330, which may be previously loaded on user device 110 or downloaded to user device 110, may then send a query to entitlement device 120, via a WiFi or other public/shared Internet connection, to check for a customer order, such as a new line order (FIG. 6, 610). Entitlement device 120 receives the query and determines if the eID/IMEI is associated with a new line order. For example, entitlement device 120 may use the eID/IMEI of user device 110 to query one or more backend systems, such as a billing system/order system associated with entitlement device 120, to determine if the customer has a pending order for a new line. If an order for a new line corresponding to the eID/IMEI is found (FIG. 6, 612), entitlement device 120 may send a message to user device 110 inquiring whether the user would like to activate the new line (FIG. 6, 620).

Use device 110 receives the activate request message and outputs a message to the user inquiring whether the user wishes to activate the new line. For example, carrier application 330 receives the message from entitlement device 120 and outputs a message via output device 250 (e.g., an LCD screen) asking the user to confirm that he/she wishes to activate the new line. Assume that the user elects to activate the new line (FIG. 6, 622). Carrier application 330 receives the user input and sends an activation request to entitlement device 120 (FIG. 6, 630).

Entitlement device 120 may then transmit an activate pending new line order message to carrier provisioning system 130 (FIG. 6, 640). In an exemplary implementation, the activate pending new line order message includes the eID/IMEI of user device 110. Carrier provisioning system 130 receives the activate pending new line message, identifies an address associated with SIM provisioning system 140, such as the FQDN of SIM provisioning system 140, and forwards the FQDN of SIM provisioning system 140 to entitlement device 120 (FIG. 6, 650). Entitlement device 120 receives the FQDN of SIM provisioning system 140 and forwards an activate new line order response message to user device 110 (FIG. 6, 660). The activate new line order response message 660 may include a successful new line order indication and the FQDN of SIM provisioning system 140.

User device 110 receives the activate new line order message. LPA logic 320 of user device 110 may obtain the FQDN of SIM provisioning system 140 from the active new line order response message 660 (FIG. 6, 662). LPA logic 320 may then send a query to SIM provisioning system 140, using the obtained FQDN, for the SIM profile (FIG. 6, 670). LPA logic 330 may include the eID/IMEI of user device 110 with the SIM profile request message 670. SIM provisioning system 140 receives the query and downloads the SIM profile to user device 110 (FIG. 6, 680). User device 110 receives the SIM profile and stores the SIM profile in eUICC 310. For example, LPA logic 320 may store the SIM profile in eUICC 310. Upon storing the SIM profile in eUICC 310, user device 110 is activated with the wireless service provider (FIG. 6, 682). In some implementations, LPA logic 320 and/or carrier application 330 may generate a refresh command to update the eSIM profile in eUICC 310, resulting in activation of user device 110. In either case, a user may activate a new line order for a new mobile device in a very efficient manner and without having to manually initiate a contact with customer service, scan a QR code, etc.

Figure 7:
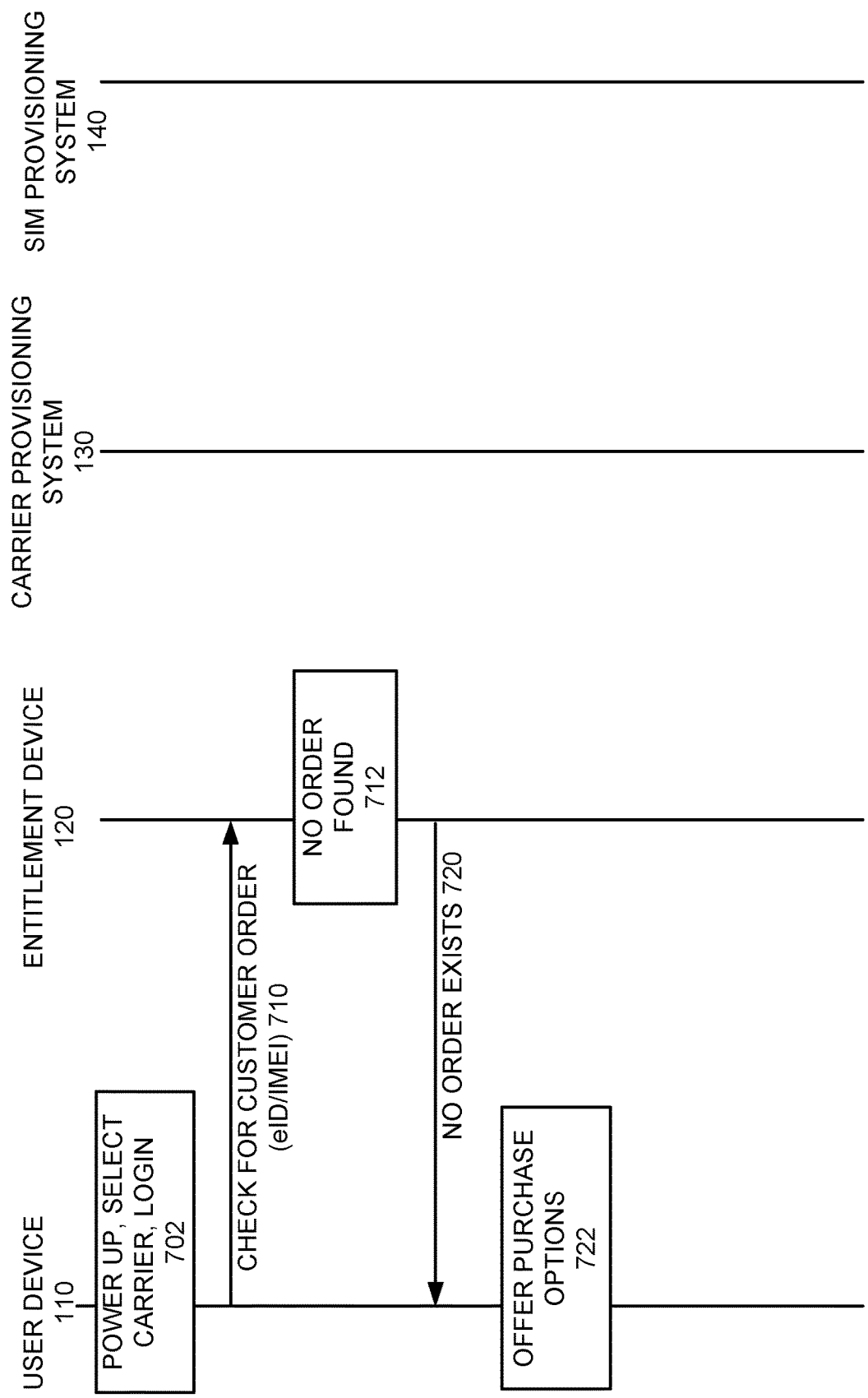
FIG. 7 is a flow diagram illustrating processing by various components of FIGS. 1-3 in accordance with another exemplary implementation.

As described above, a customer may activate an upgrade order associated with a new mobile device and activate an order associated with a new line. In other instances, a customer may wish to activate user device 110 in which no prior order has been made (FIG. 4A, block 440—no). FIG. 7 is a signal flow diagram associated with a customer attempting to activate a new device for which no pending order exists. That is, the user may have purchased a new mobile device that includes an eSIM, and wishes to establish service for the mobile device with a wireless service provider with which the user is not a current customer.

Processing may begin in a manner similar to that described above with respect to FIGS. 4A, 4B and 5. For example, a customer at user device 110 may power up user device 110, select a particular carrier and launch carrier application 330 (FIG. 7, 702). As described above, carrier application 330 may be previously loaded on user device 110 or downloaded to user device 110 via a WiFi or public/shared Internet connection. The user may also provide a login for carrier application 330 (FIG. 7, 702).

Upon receiving the customer login, carrier application 330 may communicate with LPA logic 320 to obtain the eID/IMEI stored in LPA logic 320. Carrier application 330 may then send a query to entitlement device 120, via a WiFi connection, to check for a customer order, such as an upgrade order or a new line order (FIG. 7, 710). Entitlement device 120 receives the query and determines if the eID/IMEI is associated with a customer order (FIG. 7, 712). For example, entitlement device 120 may query one or more backend systems, such as a billing system/order system associated with entitlement device 120 to determine if the customer has a pending order. Assume that no order corresponding to the eID/IMEI is found (FIG. 7, 712). In this case, entitlement device 120 may send a message to user device 110 indicating that no order exists for user device 110 (FIG. 7, 720).

User device 110 receives the message and carrier application 330 may output a user interface (e.g., via output device 250, such as an LCD screen of user device 110) inquiring whether the user would like to activate new service for user device 110 (FIG. 7, 722). In this scenario, the user may be provided with various wireless service plans, including an amount of data user per month, call minutes per month, monthly costs, etc. The user may then select the appropriate plan and may interact with entitlement device 120 to obtain and download a SIM profile for eSIM 310 in a manner similar to that described above, for example, with respect to FIG. 6.

Implementations described herein provide for activation of user devices with eSIMs that do not include previously loaded SIM profiles associated with a particular service provider. The activation is provided in a seamless manner for all types of customer orders, include an upgrade order and an order for a new service. In each case, the activation is provided with little to no human interaction on the part of the user and service provider and improves the customer's experience with respect to activating a new device. Since little to no human interaction is needed for activation, the activation process also reduces congestion/delays at the service provider's support system and improving customer satisfaction with respect to activating a new device.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, features have been described above with respect to activating a user device, such as a smart phone. In other implementations, other types of devices may be activated in a similar manner. For example, fixed devices, such as IoT devices using machine-type communications that include eSIMs may be activated in a similar manner to that described above.

Further, while series of acts have been described with respect to FIGS. 4A and 4B and signal flows with respect to FIGS. 5-7, the order of the acts and/or signal flows may be different in other implementations. Moreover, non-dependent acts may be implemented in parallel.

To the extent the aforementioned embodiments collect, store or employ personal information of individuals, it should be understood that such information shall be collected, stored and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
receiving, from a user device, identification information associated with the user device;
determining, by a wireless service provider, whether the user device is associated with a first order corresponding to a new service associated with the wireless service provider or a second order corresponding to an existing service associated with the wireless service provider;
activating the second order, by the wireless service provider, in response to determining that the user device is associated with the second order;
identifying, by the wireless service provider, address information of a network device associated with obtaining a subscriber identity module (SIM) profile for the user device;
forwarding the address information of the network device to the user device;
receiving, by the network device, a request from the user device for the SIM profile; and
transmitting, by the network device, the SIM profile to the user device in response to receiving the request,
wherein the activating the second order comprises:
creating a new record associated with activating the user device, and
deleting an existing record associated with a second user device that was previously active and is associated with a same subscriber that is associated with the user device.

2. The method of claim 1, wherein the address information comprises a fully qualified domain name (FQDN) of the network device, and the method further comprises:
determining that the user device is associated with the first order; and
transmitting the FDQN of the network device to the user device in response to determining that the user device is associated with the first order.

3. The method of claim 1, wherein the identification information comprises an embedded universal integrated circuit card (eUICC) identifier (eID) or an international mobile equipment identity (IMEI) number associated with the user device.

4. The method of claim 1, wherein the activating the second order comprises:
designating the SIM profile stored in the network device for download.

5. The method of claim 1, further comprising:
moving information associated with the second order from a first storage location associated with pending orders to a second storage location associated with activated user devices.

6. The method of claim 5, wherein the second storage location comprises a home subscriber server or a unified data management function associated with the wireless service provider.

7. The method of claim 1, further comprising:
determining that the user device is not associated with the first order or the second order; and
providing information to the user device regarding options for wireless service.

8. The method of claim 1, wherein the receiving identification information comprises receiving the identification information via an application associated with the wireless service provider and stored on the user device.

9. The method of claim 1, wherein the SIM profile transmitted to the user device is to be stored in an embedded SIM card on the user device.

10. A system, comprising:
at least one device comprising at least one processor configured to:
receive, from a user device, identification information associated with the user device,
determine whether the user device is associated with a first order corresponding to a new service associated with a wireless service provider or a second order corresponding to an existing service associated with the wireless service provider,
activate the second order, in response to determining that the user device is associated with the second order,
identify address information associated with obtaining a subscriber identity module (SIM) profile for the user device,
forward the address information to the user device,
receive a request from the user device for the SIM profile, and
transmit the SIM profile to the user device in response to receiving the request,
wherein when activating the second order, the at least one processor is configured to:
create a new record associated with activating the user device, and
delete an existing record associated with a second user device that was previously active and is associated with a same subscriber that is associated with the user device.

11. The system of claim 10, wherein the at least one processor is further configured to:
determine that the user device is associated with the first order, and
transmit the address information to the user device in response to determining that the user device is associated with the first order.

12. The system of claim 10, wherein the address information comprises a fully qualified domain name of a network device that stores SIM profiles for a plurality of user devices.

13. The system of claim 10, wherein the at least one processor is further configured to:
move information associated with the second order from a first storage location associated with pending orders to a second storage location associated with activated user devices.

14. The system of claim 13, wherein the second storage location comprises a home subscriber server or unified data management function associated with the wireless service provider.

15. The system of claim 10, wherein the at least one device comprises:
a first network device configured to receive customer requests associated with activating user devices with embedded SIM cards; and
a second network device configured to provide SIM profiles for the user devices with embedded SIMs.

16. A device, comprising:
a memory configured to store instructions;
an embedded universal integrated circuit card (eUICC); and
at least one processor configured to execute the instructions stored in the memory to:
obtain an embedded universal integrated circuit card (eUICC) identifier (eID) or international mobile equipment identity (IMEI) number of the device,
forward the eID or IMEI number to a first network device associated with activating the device,
receive an address associated with a second network device configured to store a subscriber identity module (SIM) profile for the device,
send, using the received address, a request for the SIM profile to the second network device,
receive the SIM profile from the second network device, and
store the SIM profile in the eUICC.

17. The device of claim 16, wherein the address comprises a fully qualified domain name (FQDN) of the second network device.

18. The device of claim 16, wherein the memory is configured to store an application associated with a wireless service provider and executed by the at least one processor, and wherein the first network device and second network device are associated with the wireless service provider.

19. The system of claim 10, wherein the identification information comprises an embedded universal integrated circuit card (eUICC) identifier (eID) or an international mobile equipment identity (IMEI) number associated with the user device.

20. The device of claim 16, wherein the first and second network devices are associated with a wireless service provider and the device comprises a smart phone.

\* \* \* \* \*